United States Patent
Fries-Carr et al.

[11] Patent Number: 5,844,770
[45] Date of Patent: Dec. 1, 1998

[54] CAPACITOR STRUCTURES WITH DIELECTRIC COATED CONDUCTIVE SUBSTRATES

[75] Inventors: Sandra J. Fries-Carr; Richard L.C. Wu, both of Beavercreek; Peter B. Kosel, Cincinnati, all of Ohio

[73] Assignee: K Systems Corporation, Beavercreek, Ohio

[21] Appl. No.: 915,824

[22] Filed: Aug. 21, 1997

Related U.S. Application Data

[60] Provisional application No. 60/024,265 Aug. 21, 1996.
[51] Int. Cl.$^6$ .............................. H01G 4/32; H01G 4/005; H01G 4/20
[52] U.S. Cl. ...................... 361/301.5; 361/303; 361/305; 361/312; 361/313; 29/25.42
[58] Field of Search .............................. 361/301.3, 301.4, 361/301.5, 303, 305, 306.3, 311, 312, 313, 321.1–321.5, 323, 329; 29/25.42; 429/461; 501/134–138

[56] References Cited

U.S. PATENT DOCUMENTS

| | | | |
|---|---|---|---|
| 3,539,886 | 11/1970 | Kellerman et al. | 361/301.5 |
| 3,728,765 | 4/1973 | Behn et al. | 29/25.42 |
| 5,018,048 | 5/1991 | Shaw et al. | 361/323 |
| 5,032,461 | 7/1991 | Shaw et al. | 428/461 |
| 5,097,800 | 3/1992 | Shaw et al. | 118/730 |
| 5,125,138 | 6/1992 | Shaw et al. | 29/25.42 |
| 5,192,523 | 3/1993 | Wu et al. | 427/523 |
| 5,412,160 | 5/1995 | Yasumoto et al. | 174/258 |
| 5,431,963 | 7/1995 | Rzad et al. | 427/534 |
| 5,464,667 | 11/1995 | Köhler et al. | 427/577 |
| 5,532,512 | 7/1996 | Fillion et al. | 257/686 |
| 5,576,925 | 11/1996 | Gorowitz et al. | 361/301.2 |
| 5,615,078 | 3/1997 | Hudis et al. | 361/313 |

FOREIGN PATENT DOCUMENTS

| | | |
|---|---|---|
| 196 32 270 | of 1996 | Germany . |
| 91014218 | of 1991 | Japan . |

OTHER PUBLICATIONS

*Plasma Deposited Thin Films*, Mort et al. eds. (CRC Press 1986) pp. 89–126.
Wu et al., "Physical and Tribological Properties of Rapid Thermal Annealed Diamond–like Carbon Films," Surface and Coatings Technology, 54/55, 576–580 (1992).
Kosel et al., "Diamond–like Carbon Films for High Temperature Electronic Applications," Electrochem. Socty Proceedings, V. 95–4, 681–686 (1995).
Kospel et al., "Comparison of Diamond–like Carbon and Polycrystalline Diamond Films for High Temperature Capacitors," NISTIR 5692, 37s–40s (1995).
Wu et al., "Uniform and Large Area Deposition of Diamond–like Carbon Using RF Source Ion Beam", Mat. Res. Symp. Proc. vol. 354, pp. 63–68 (1995).
Dalton et al., "Diamond–like Carbon Film Properties from Optical and Electrical Measurements," Proc. MRS on Amorphous and Crystalline Insulating Thin Film IV (1996).

*Primary Examiner*—Bot L. Ledynh
*Assistant Examiner*—Anthony Dinkins
*Attorney, Agent, or Firm*—Killworth, Gottman, Hagan & Schaeff, L.L.P.

[57] ABSTRACT

One aspect of the present invention is directed to a capacitor. The capacitor includes a first layer and a second layer. The first layer includes a first electrically conductive substrate having a first surface and a second surface. A first dielectric film is deposited on the first surface of the first substrate and a second dielectric film is deposited on the second surface of the first substrate. The second layer contacts the first layer. The second layer includes a second electrically conductive substrate having a first surface and a second surface. A third dielectric film is deposited on the first surface of the second substrate, and a fourth dielectric film is deposited on the second surface of the second substrate.

12 Claims, 7 Drawing Sheets

CAPACITOR STRUCTURES WITH DIELECTRIC COATED CONDUCTIVE SUBSTRATES

The United States Government has rights in this invention pursuant to Contract No. F33615-94-C-2423 awarded by the United States Department of the Air Force.

CROSS REFERENCE TO RELATED APPLICATIONS

This application claims priority from United States Provisional Patent Application No. 60/024,265 which is entitled "Method for Forming High Energy Density Diamond-like Carbon or Polycrystalline Diamond Capacitors" and which was filed Aug. 21, 1996 now abandoned.

BACKGROUND OF THE INVENTION

The present invention relates to capacitors which are non-polar in nature and which are suitable for both alternating current and direct current applications. Particularly, the present application relates to rolled or wound capacitors and parallel-plate stacked capacitors.

Several kinds of polymer film capacitors exist which are identified by the dielectric material that is used in their construction. Common dielectric materials used to make polymer film capacitors include polycarbonate, polyester, polypropylene, polystyrene and polysulfone. Polymer film capacitors are usually made by rolling a stack of alternating sheets of polymer and metal foils into a tubular shape which is convenient for mounting in a variety of orientations in electronic circuits because of the symmetry of that shape. Two electrical wire connections are normally provided on these capacitors which are usually placed in one of three positions: axially opposite each other; radially on the same side as each other; or together at the same end. The arrangement of the electrical wiring is determined by the capacitor size, the intended application, the intended circuit component density and the required vibration resistance.

In conventional capacitors, the dielectric material comprises single or multiple layers of polymer sheets stacked between electrically conductive substrates. In conventional polymer capacitors, the dielectric material exists in the form of thick layers which must be self-supporting and thick enough to sustain the necessary operating voltage and physical handling. The large thickness of the polymer sheets in this case reduces the energy storage density of the capacitors. In conventional capacitors which employ a polymer sheets as the dielectric material, the layer of dielectric material, i.e. the polymer sheet, typically has a thickness of at least 3–6 microns.

A standard method for producing wound polymer capacitors involves stacking up to two polymer sheets to form the dielectric material on each layer of conductive substrate, combining at least two of such stacks and rolling the two stacks as a unit to form a capacitor device having a cylindrical form. The conductive and dielectric layers take the form of strips and are wound so that the conductive layer is interleaved with the dielectric layer. In these constructions, the edge of one conductive layer extends beyond the edge of its immediate dielectric neighbor and the other conductive layer extends over the opposite edge of its dielectric partner so that the capacitor has a metal edge exposed at one end and a metal edge exposed at an opposite end so that external lead wires can be attached to the capacitor. External lead wires are attached to the electrodes, i.e., the exposed conductive substrate, at each end of the capacitor. Supplemental insulating tape is wrapped around the winding to hold the finished shape and to protect the electrodes from contacting the inside wall of the metal can. Additional wrapping is sometimes used to provide a snug fit for the element inside the case for vibration and shock protection.

In an alternate method, the conductive substrate is a metal film which is deposited (by sputtering, thermal evaporation, etc.) directly on the dielectric material. After the metal has been deposited on the dielectric material, two metallized dielectric materials are rolled together to form a capacitor. This type of construction provides smaller capacitors than those formed by the method discussed above. However, a disadvantage of metallized-polymer capacitors is that they have a reduced current-handling capacity because the deposited metal film is very thin (approximately 400 Å or less) in comparison to the layer(s) of the metal conductive substrates described above which have a thickness of at least 5 to 12 $\mu$m. This thin metal film restricts the power and current usage of the capacitor.

Thus, a need currently exists in the art for a capacitor which is smaller than that presently used and which has an electrical storage capacity greater than conventional capacitors.

SUMMARY OF THE INVENTION

The present invention solves the currently existing need in the art for a smaller capacitor and a capacitor with improved properties in relation to currently existing capacitors.

One aspect of the present invention is directed to a capacitor. The capacitor includes a first layer and a second layer. The first layer includes a first electrically conductive substrate having a first surface and a second surface. A first dielectric film is deposited on the first surface of the first substrate and a second dielectric film is deposited on the second surface of the first substrate. The second layer contacts the first layer. The second layer includes a second electrically conductive substrate having a first surface and a second surface. A third dielectric film is deposited on the first surface of the second substrate, and a fourth dielectric film is deposited on the second surface of the second substrate.

Another aspect of the present invention is directed to a flexible capacitor which includes a plurality of layers with each layer contacting at least one other layer. Each layer includes an electrically conductive substrate having a first surface and a second surface. A first dielectric film is deposited on the first surface of the substrate and a second dielectric film is deposited on the second surface of the substrate.

Useful electrically conductive substrates for the capacitors of the present invention can be formed from a metal foil or sheet comprising material such as aluminum, molybdenum, copper, stainless steel, titanium, and nickel. Desirably, the substrate will be a capacitor grade aluminum foil.

Useful dielectric materials for forming the dielectric films of the capacitors of the present invention are selected from the group consisting of polymers, diamond-like carbon and amorphous ceramics. Useful polymers include polycarbonate, polyester, polypropylene, polystyrene and polysulfone. Desirably, the dielectric material is diamond-like carbon.

The present invention is also directed to a method for depositing a dielectric film on an electrically conductive substrate. The method includes the steps of providing an electrically conductive substrate having an edge region;

passing the electrically conductive substrate behind a masking plate, the masking plate having a first aperture and a second aperture which mask the edge region from a source of dielectric material; depositing, through the first aperture in the masking plate, a first film of dielectric material on a first side of the electrically conductive substrate such that the edge remains uncoated with dielectric material; moving the electrically conductive substrate around a series of rollers such that a second side of the electrically conductive substrate becomes exposed to the source of dielectric material; and depositing, through the second aperture in the masking plate, a second film of dielectric material on the second side of the electrically conductive substrate so that the edge region remains uncoated with dielectric material.

Thus, it is an object of the present invention to provide a capacitor which is smaller than conventional capacitors and which has an electrical storage capacity greater than that of conventional capacitors. Other objects and advantages of the invention will be apparent from the following detailed description, the accompanying drawings and the appended claims.

DETAILED DESCRIPTION OF THE INVENTION

Figure 1:
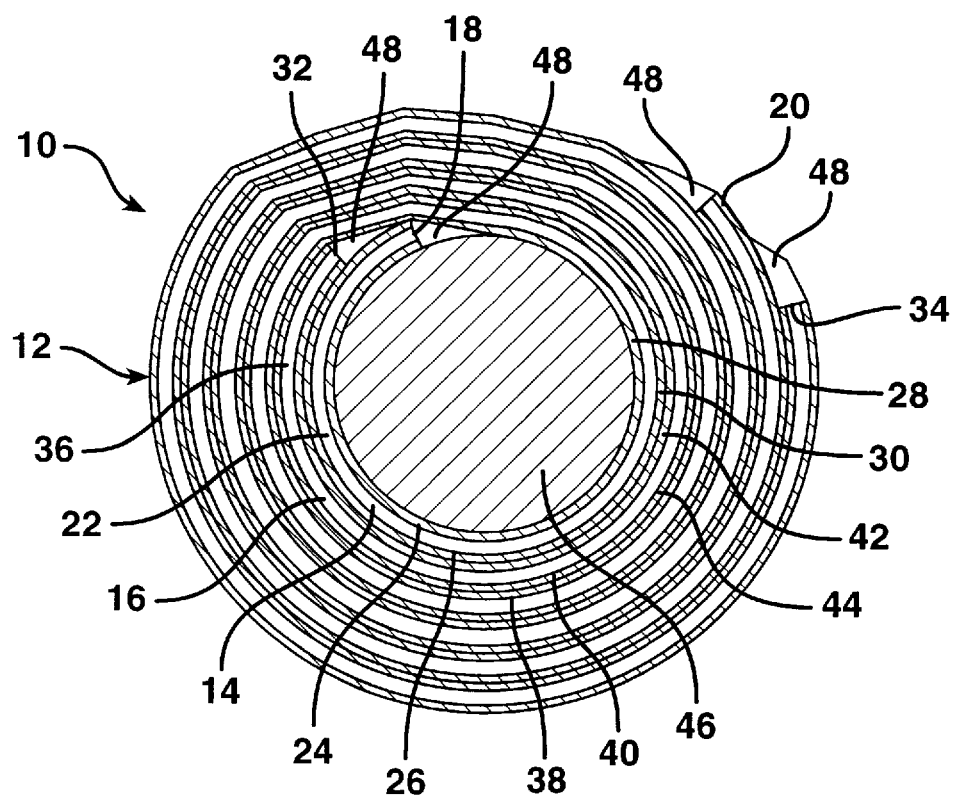
FIG. 1 presents a radial cross sectional view of a rolled capacitor of the present invention.

The present invention is directed to a capacitor which can be formed into a variety of shapes from flexible dielectric-coated substrates depending upon the desired end use. A first capacitor 10 of the present invention is shown in FIG. 1. The capacitor 10 is shown as having a rolled configuration 12. The capacitor 10 includes a first capacitor layer 14 and a second capacitor layer 16. Second capacitor layer 16 contacts first capacitor layer 14. Typically, second capacitor layer 16 is brought into contact with first capacitor layer 14 by stacking second capacitor layer 16 on first capacitor layer 14 or vice versa. First capacitor layer 14 has a first end 18 and a second end 20. First capacitor layer 14 comprises an electrically conductive substrate 22 which has a first side 24 and a second side 26. A first dielectric film 28 is deposited on first side 24 of substrate 22 and a second dielectric film 30 is deposited on second side 26 of substrate 22. Second capacitor layer 16 has a first end 32 and a second end 34. Second capacitor layer 16 comprises an electrically conductive substrate 36 which has a first side 38 and a second side 40. A first dielectric film 42 is deposited on first side 38 of substrate 36 and a second dielectric film 44 is deposited on second side 40 of substrate 36. The first layer 14 and the second layer 16 are wrapped around a former 46. Former 46 is formed from an electrically insulating and nonconducting material which will withstand the operating temperature of capacitor 10 without failure. Useful materials for former 46 include glass, ceramics, and polymeric materials. The first ends 18 and 32 of the first capacitor layer 14 and the second capacitor layer 16, respectively, are secured to former 46 with an adhesive 48. The second ends 20 and 34 of the capacitor layers 14 and 16, respectively, are also secured with an adhesive 48 to their respective underlying layers.

Although not shown in the drawings, opposite edges of the first substrate 22 and the second substrate 36 are not coated with dielectric film so that electrodes can be attached to each end of capacitor 10. External electrical leads are attached to the electrodes of capacitor 10 for device applications.

The electrically conductive substrates 22 and 36 desirably have a thickness of less than or equal to about 4.5 microns. The dielectric films 28, 30, 42 and 44, each desirably have a thickness of less than or equal to about 0.5 microns. Comparably, in conventional polymeric capacitors, the dielectric material itself has a thickness of approximately 6 microns. Thus, the capacitor 10 of the present invention can be made smaller than conventional polymer capacitors.

By providing two layers 14 and 16 which each comprise an electrically conductive substrate 22 and 36, respectively, having a dielectric film 28 and 30, and 42 and 44, respectively, deposited on each of its sides, the capacitor 10 reduces, if not eliminates, the undesirable effects of pinholes. Pinholes cause a reduction in the dielectric constant of the capacitor by creating an air gap between adjacent layers of the electrically conductive substrate. Such an air gap has a lower voltage breakdown strength which renders the capacitor useless. In the present invention, two layers of dielectric material are positioned between two adjacent layers of electrically conductive substrate. This prevents the occurrence on adjacent layers of dielectric film of correspondingly positioned pinholes which would cause an air gap between adjacent layers of electrically conductive substrate.

Useful adhesives 48 are compatible with the thermal, electrical and mechanical properties of the capacitor 10. Such adhesives include, but are not limited to, epoxies, polyimides, acrylates, and silicones. The adhesive 48 should be applied as thinly as possible so as to not increase the thickness of the structure of the capacitor 10 any more than is necessary. Alternately, ends 20 and 34 could be secured by wrapping several turns of a high temperature polymer film around capacitor 10 and anchoring it with at least one piece of high temperature adhesive tape.

Figure 2:
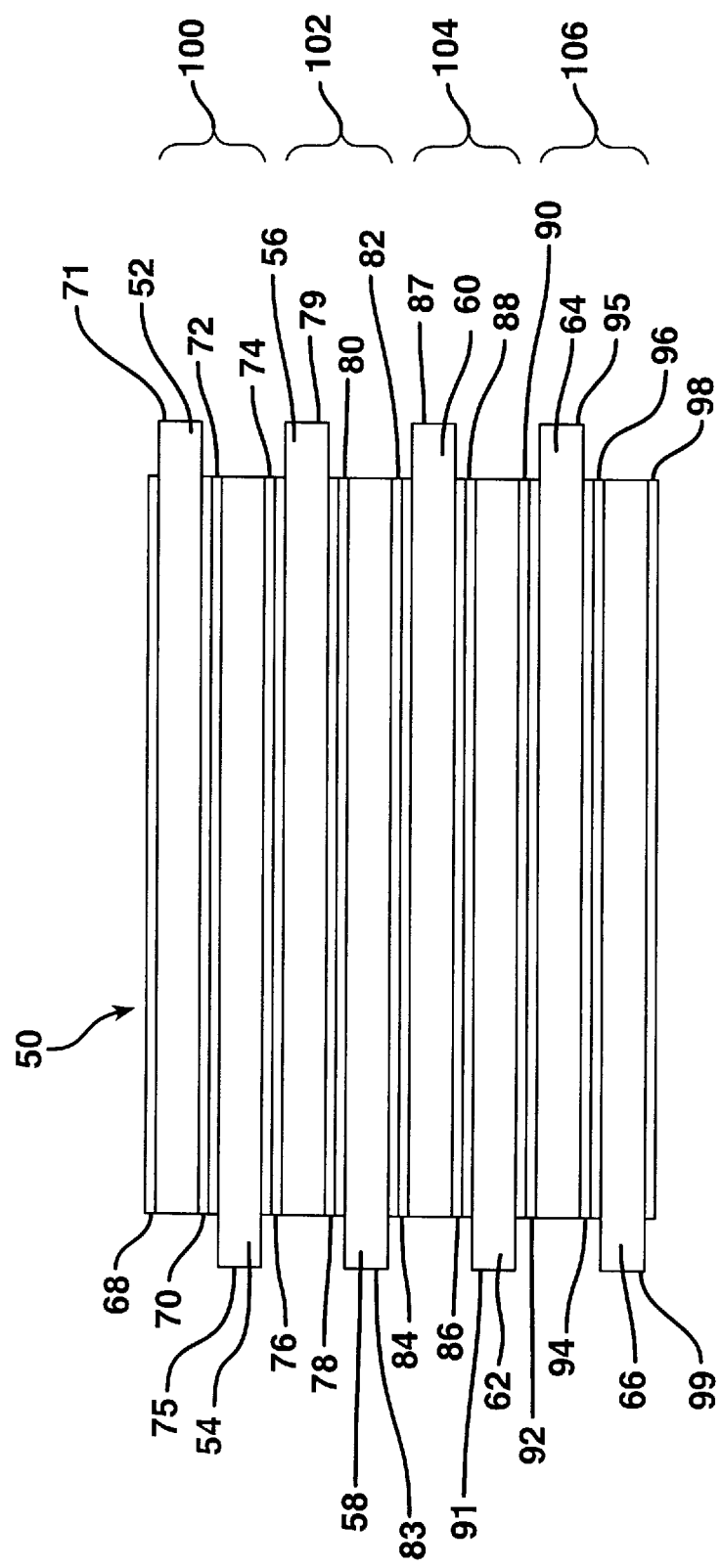
FIG. 2 presents a partial cross sectional view of a parallel-plate stacked capacitor of the present invention.

FIG. 2 presents an end view of another capacitor 50 of the present invention. Capacitor 50 comprises a plurality of electrically conductive substrates 52, 54, 56, 58, 60, 62, 64 and 66. The capacitor 50 includes a first electrically conductive substrate 52, a second electrically conductive substrate 54, a third electrically conductive substrate 56, a fourth electrically conductive substrate 58, a fifth electrically conductive substrate 60, a sixth electrically conductive substrate 62, a seventh electrically conductive substrate 64 and an eighth electrically conductive substrate 66. First substrate 52 has a first dielectric film 68 deposited on one side and a second dielectric film 70 deposited on the opposite side. First dielectric film 68 and second dielectric film 70 are deposited on substrate 52 such that an edge 71 of substrate 52 remains uncoated to allow for the attachment of electric leads to substrate 52. Second substrate 54 includes a first dielectric film 72 deposited on one side and a second dielectric film 74 deposited on the other side. First dielectric film 72 and second dielectric film 74 are deposited on substrate 54 such that an edge 75 of substrate 54 remains uncoated to allow for the attachment of electric leads to substrate 54. Third substrate 56 includes a first dielectric film 76 deposited on one side and a second dielectric film 78 deposited on the opposite side. First dielectric film 76 and second dielectric film 78 are deposited on substrate 56 such that an edge 79 of substrate 56 remains uncoated to allow for the attachment of electric leads to substrate 56. Fourth substrate 58 includes a first dielectric film 80 deposited on one side and a second dielectric film 82 deposited on the opposite side. First dielectric film 80 and second dielectric film 82 are deposited on substrate 58 such that an edge 83 of substrate 58 remains uncoated to allow for the attachment of electric leads to substrate 58. Fifth substrate 60 includes a first dielectric film 84 deposited on one side and a second dielectric film 86 deposited on the opposite side. First dielectric film 84 and second dielectric film 86 are deposited on substrate 60 such that an edge 87 of substrate 60 remains uncoated to allow for the attachment of electric leads to substrate 60. Sixth substrate 62 includes a first dielectric film 88 and a second dielectric film 90 deposited on its sides. First dielectric film 88 and second dielectric film 90 are deposited on substrate 62 such that an edge 91 of substrate 62 remains uncoated to allow for the attachment of electric leads to substrate 62. Seventh substrate 64 includes a first dielectric film 92 and a second dielectric film 94 deposited on its sides. First dielectric film 92 and second dielectric film 94 are deposited on substrate 64 such that an edge 95 of substrate 64 remains uncoated to allow for the attachment of electric leads to substrate 64. Eighth substrate 66 includes a first dielectric film 96 and a second dielectric film 98 deposited on its sides. First dielectric film 96 and second dielectric film 98 are deposited on substrate 66 such that an edge 99 of substrate 66 remains uncoated to allow for the attachment of electric leads to substrate 66.

First substrate 52 and second substrate 54 and their associated dielectric films 68 and 70, and 72 and 74, respectively, form a layer 100. Third substrate 56 and fourth substrate 58 and their associated dielectric films 76 and 78, and 80 and 82, respectively, form a second layer 102. Fifth substrate 60 and sixth substrate 62 and their associated dielectric films 84 and 86, and 88 and 90, respectively, form a third layer 104. Seventh substrate 64 and eighth substrate 66 and their associated dielectric films 92 and 94, and 96 and 98, respectively, form a fourth layer 106.

To form a capacitor, the layers 100, 102, 104 and 106 are stacked so that layer 100 contacts layer 102, layer 102 contacts layer 104, and layer 104 contacts layer 106. If desired, the layers 100, 102, 104 and 106 are stacked so that the uncoated edges 71, 75, 79, 83, 87, 91, 95 and 99 are alternately exposed on each end of the capacitor. As shown in FIG. 2, uncoated edges 71, 79, 87 and 95 are positioned on one side of capacitor 50 while uncoated edges 75, 83, 91 and 99 are positioned on the opposite end of capacitor 50. This is done so that electric leads can be attached to each end of capacitor 50. The layers 100–106 can also be rolled about a former, such as former 46 shown in FIG. 1, to form a rolled capacitor. Because it is formed from flexible materials, the capacitor 50 can be used on curved surfaces and in instances in which the capacitor would experience vibrational forces.

The electrically conductive substrate layers 52, 54, 56, 58, 60, 64 and 66 desirably have a thickness of less than or equal to about 4.5 microns. The dielectric films 68, 70, 72, 74, 76, 78, 80, 82, 84, 86, 88, 90, 92, 94, 96 and 98, each desirably have a thickness of less than or equal to about 0.5 microns.

Useful electrically conductive substrates for the capacitors of the present invention can be formed from a metal foil or sheet comprising material such as aluminum, molybdenum, copper, stainless steel, titanium, and nickel. Desirably, the substrate will be a capacitor grade aluminum foil.

Useful dielectric materials for forming the dielectric films of the capacitors of the present invention are selected from the group consisting of polymers, diamond-like carbon and amorphous ceramics. Useful polymers include polycarbonate, polyester, polypropylene, polystyrene and polysulfone.

Desirably, the dielectric material will be diamond-like carbon. Diamond-like carbon film provides a dielectric constant between about 2.5 and about 3.5. The thermal conductivity of diamond-like carbon is four times that of any conventional polymer film. By forming the capacitors of the present invention using diamond-like carbon as the dielectric material, a capacitor having a high DC resistance, a high voltage breakdown strength, and high thermal conductivity can be formed. This capacitor has a high resistivity and a voltage breakdown strength of greater than 15 KV/mil. Most importantly, this capacitor forms a capacitance on the order of 10's of microfarads. Additionally, such a capacitor is electrically stable in temperatures from about −55° C. to about 200° C. Further, a rolled capacitor formed using diamond-like carbon as the dielectric material has a size which is ten to thirty times smaller than a conventional rolled capacitor.

Figure 3:
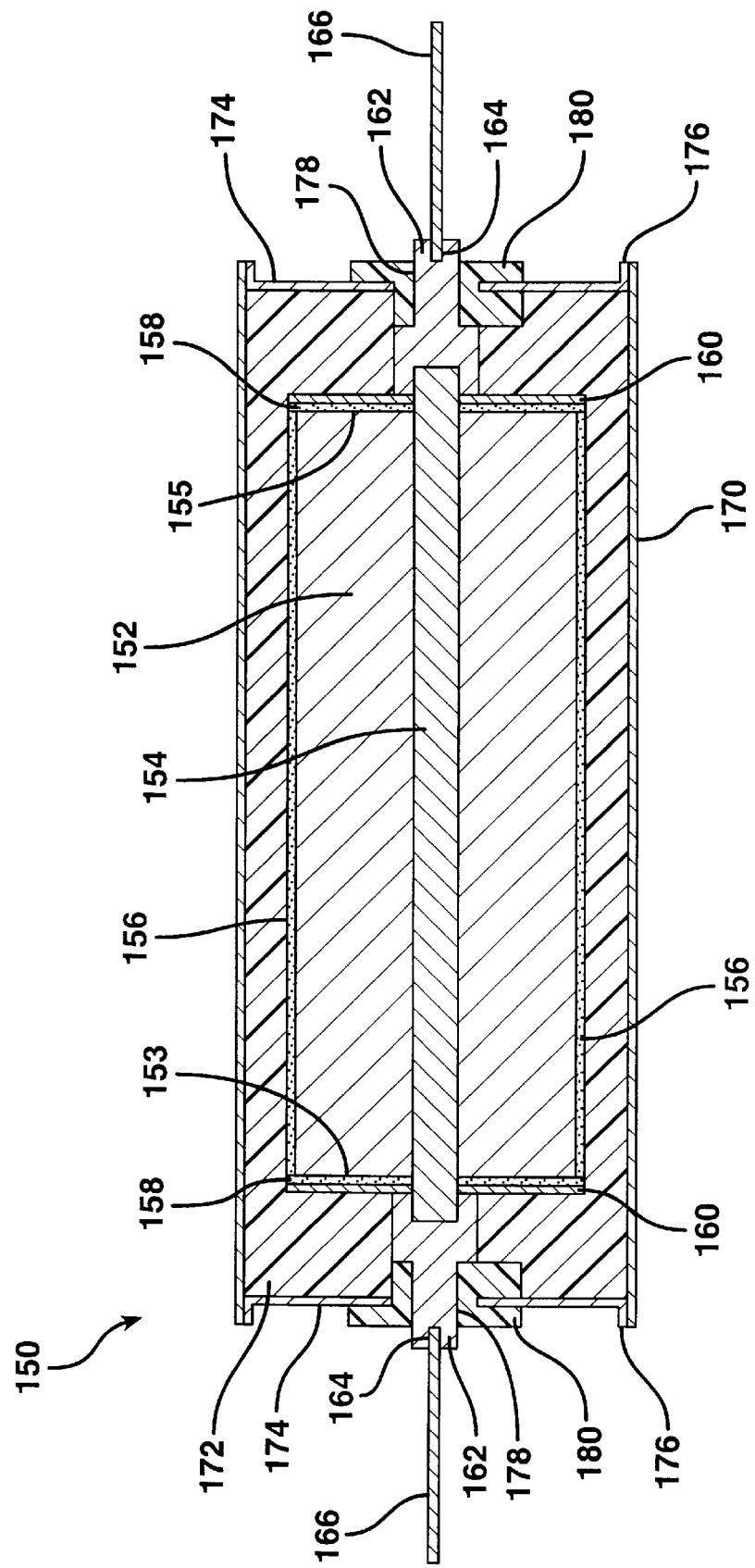
FIG. 3 presents an axial cross sectional view of a capacitor assembly into which the capacitors of this invention can be formed.

FIG. 3 presents an axial cross sectional view of a capacitor assembly 150 into which the capacitors of this invention can be formed. The capacitor assembly 150 includes a rolled capacitor 152, such as capacitor 10, and which is formed about a former 154. A retention coating 156 is applied to capacitor 152 to maintain capacitor 152 in its rolled configuration. Rolled capacitor 152 further includes a first end 153 and a second end 155. A temperature conductive adhesive 158 is coated on the ends 153 and 155 of the rolled capacitor 152. Each end, 153 and 155, of the rolled capacitor 152 is covered with a metal disk electrode 160. Metal studs 162 are attached to the electrodes by soldering before adhering the electrodes to the ends of the former 154 with a non-conductive adhesive to hold the structure together. Metal studs 162 define an aperture 164 into which wire leads 166 are positioned. Wire leads 166 can be positioned in apertures 164 in metal studs 162 by soldering. The rolled capacitor 152 is positioned in a metal cylinder 170 which is packed with an insulation material 172. The metal cylinder 170 is closed by means of metal end plates 174 which have rolled edges 176. The ends of metal cylinder 170 are rolled around the rolled edges 176 of the metal end plates 174 to close cylinder 170. Metal end plates 174 further define apertures 178 into which insulated bushes 180 are inserted.

Figure 4:
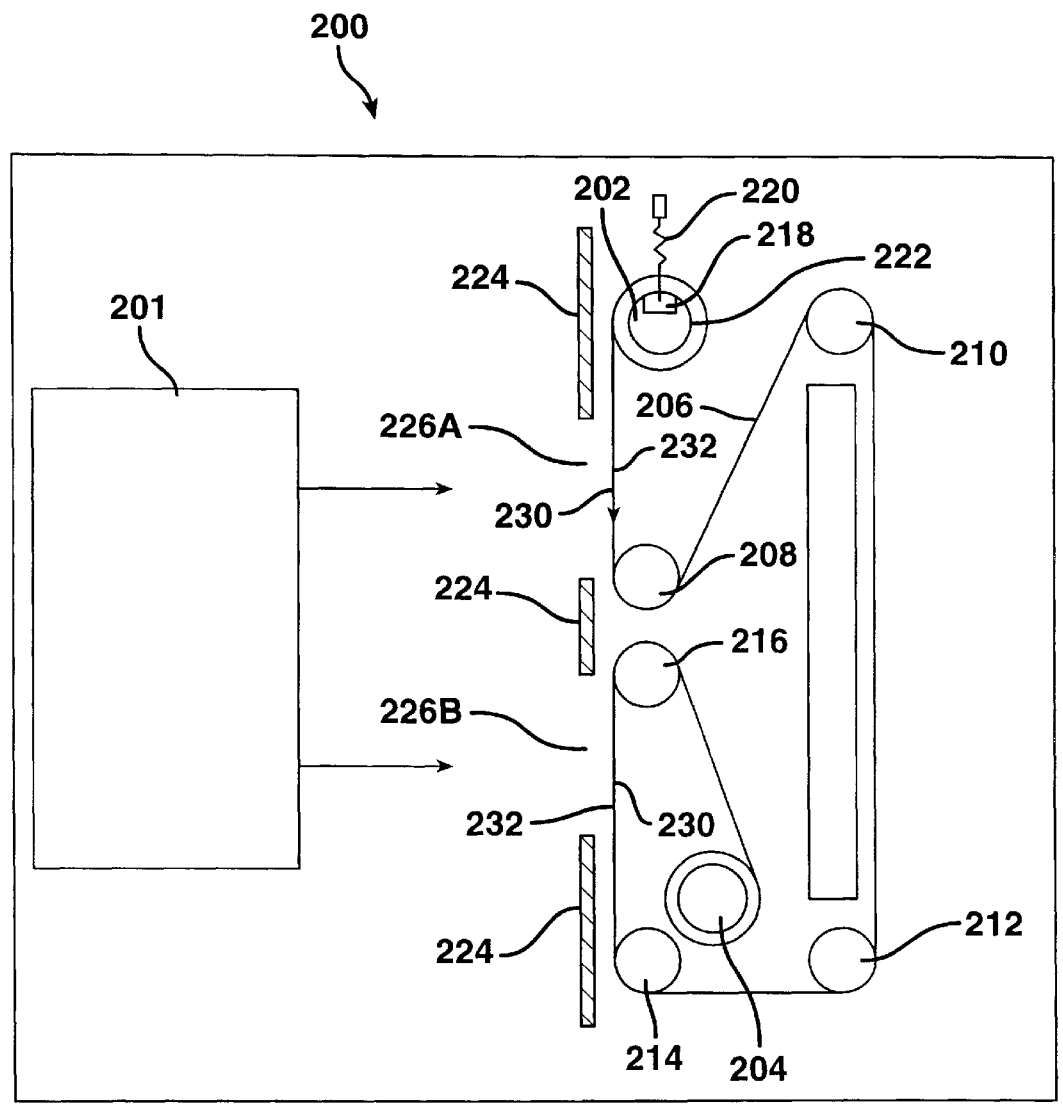
FIG. 4 presents a schematic view of an apparatus useful for depositing a dielectric film on the electrically conductive substrate.

FIG. 4 presents a schematic view of an apparatus 200 used to deposit the dielectric material on the electrically conductive substrate layer of the capacitors of the present invention. The apparatus 200 is mounted in a vacuum chamber together with a deposition source 201 of dielectric material for proper operation of the deposition source 201 and to prevent contamination from the ambient air. The apparatus 200 includes a feed spool 202 and a take-up spool 204. An electrically conductive substrate 206 is wound from feed spool 202 to take-up spool 204. To pull substrate 206 through apparatus 200, take-up spool 204 is desirably motorized. The apparatus further includes a first roller 208, a second roller 210, a third roller 212, a fourth roller 214 and a fifth roller 216. A friction pad 218 which is attached to a spring 220 makes contact with an inner surface 222 of feed spool 202 to provide friction to feed spool 202. The apparatus further includes a masking plate 224 which defines apertures 226A and 226B.

Figure 5:
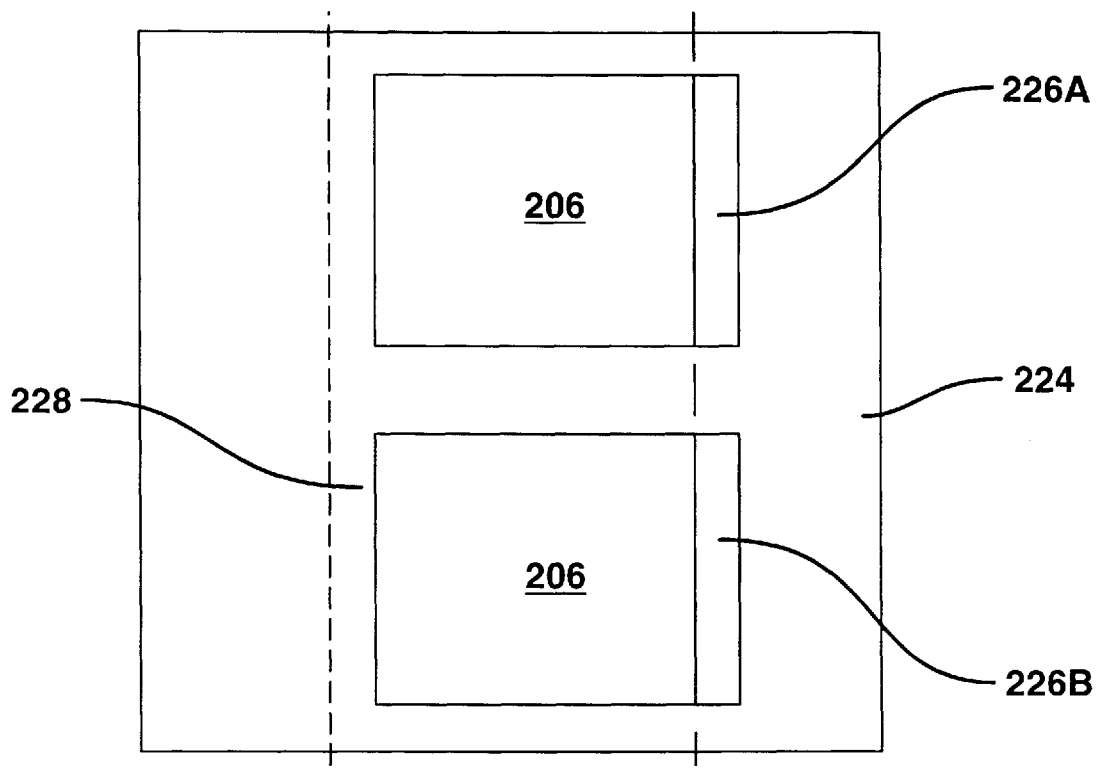
FIG. 5 presents a schematic view of the masking plate used during deposition of the dielectric film on the electrically conductive substrate.

FIG. 5 presents a top view of masking plate 224. As can be seen in FIG. 5, apertures 226A and 226B are positioned so that most, but not all, of substrate 206 is coated with the dielectric material. The apertures 226A and 226B are positioned so that the same edge 228 of substrate 206 remains uncoated on both sides.

The substrate 206 is coated with a dielectric film in the following manner. A roll of electrically conductive substrate 206 is provided on feed spool 202. The substrate 206 has a first side 230 and a second side 232. The substrate 206 is pulled through the apparatus 200 by means of the take-up spool 204. The substrate 206 is pulled past aperture 226A so that first side 230 of substrate 206 is exposed to the deposition source 201. As it passes behind aperture 226A, a dielectric film is deposited on first side 230 of substrate 206 by deposition source 201 through masking plate 224. One edge 228 of the substrate 206 is left uncoated with the dielectric film due to the positioning of aperture 226A in relation to the substrate 206. The substrate then passes over first roller 208, around second roller 210, around third roller 212 and around fourth roller 214. First roller 208, second roller 210, third roller 212 and fourth roller 214 are positioned so that as substrate 206 approaches second aperture 226B in masking plate 224, the second side 232 of substrate 206 is exposed to the deposition source 201. As substrate 206 passes behind aperture 226B in masking plate 224, a dielectric film is deposited on the second side 232 of substrate 206 by deposition source 201. The same edge 228 of substrate 206 remains uncoated with the dielectric film due to the positioning of aperture 226B in relation to substrate 206. The quality of the dielectric film deposited on substrate 206 is determined by, among other parameters, chemical and physical properties such as resistivity, pinhole density, adhesion, uniformity and thermal stability. The substrate 206 then passes around fifth roller 216 and is collected on take up spool 204.

As can be seen in FIG. 5, an edge 228 of substrate 206 is not coated with the dielectric material. The edge 228 of substrate 206 is left uncoated so that leads may be attached to substrate 206 once it is formed into a capacitor assembly, such as capacitor assembly 150 shown in FIG. 3. By positioning the apertures 226A and 226B in corresponding positions in masking plate 224, each side 230 and 232 of substrate 206 is uncoated along the same edge. One skilled in the art will appreciate that apertures 226A and 226B may be positioned so that both edges of each side 230 and 232 of substrate 206 remain uncoated if it is desired to attach leads to each end of the capacitor.

To ensure that substrate 206 is properly coated with the dielectric film, friction pad 218 makes contact with an inner surface 222 of feed spool 202. Spring 220 provides a force on friction pad 218 such that friction pad 218 does not lose contact with the inner surface 222 of feed spool 202. The friction generated by the contact of friction pad 218 with the inner surface 222 of feed spool 202 provides a force which maintains substrate 206 in a taut condition as it passes through the apparatus 200 to ensure that each side 230 and 232 of substrate 206 is evenly coated with the dielectric film.

After the dielectric film has been deposited on substrate 206, the coated substrate 206 is formed into a capacitor, such as capacitor 10 or capacitor 50. For example, two coated substrates 206 are arranged so that the uncoated edges 228 of each layer of coated substrate 206 are positioned opposite each other so that each end of the capacitor will be provided with an uncoated edge 228. The uncoated edges 228 allow electrical connections to be made to the ends of the capacitor. The two substrate layers 206 are then rolled about a former, such as former 46, to form a capacitor such as capacitor 10 or cut into sheets and stacked into a multi-layer parallel-plate capacitor such as capacitor 50.

Useful deposition sources 201 and techniques are selected from the group consisting of ion beam deposition, plasma polymerization of appropriate gases, electron beam polymerization of appropriate monomers, chemical or plasma assisted chemical vapor deposition, e-beam, thermal or laser beam evaporation or sputtering of solid dielectric sources, metallic-organic chemical vapor deposition, laser ablation and excimer laser interactions with appropriate gases at the substrate surface.

Desirably, deposition source 201 is an ion gun assembly which deposits a diamond-like carbon film through an ion beam deposition process. In an ion beam deposition process, a radio frequency (RF) (13.56 MHz) powered inductively-coupled ion source generates hydrocarbon ions which are then deposited on the surface of substrate 206. When depositing a diamond-like carbon film, good deposition results have been accomplished using the following parameters: RF power 179 watts; gas flow for $CH_4/H_2$ of 13.6 sccm/20 sccm; an ion energy of 300 eV; a substrate temperature of 100° C.; and a pressure of $10^{-4}$ Torr. The deposition conditions are monitored with a mass analyzer and the diamond-like film thickness is controlled by adjusting the beam flux and the motor speed of take-up spool 204.

Figure 6:
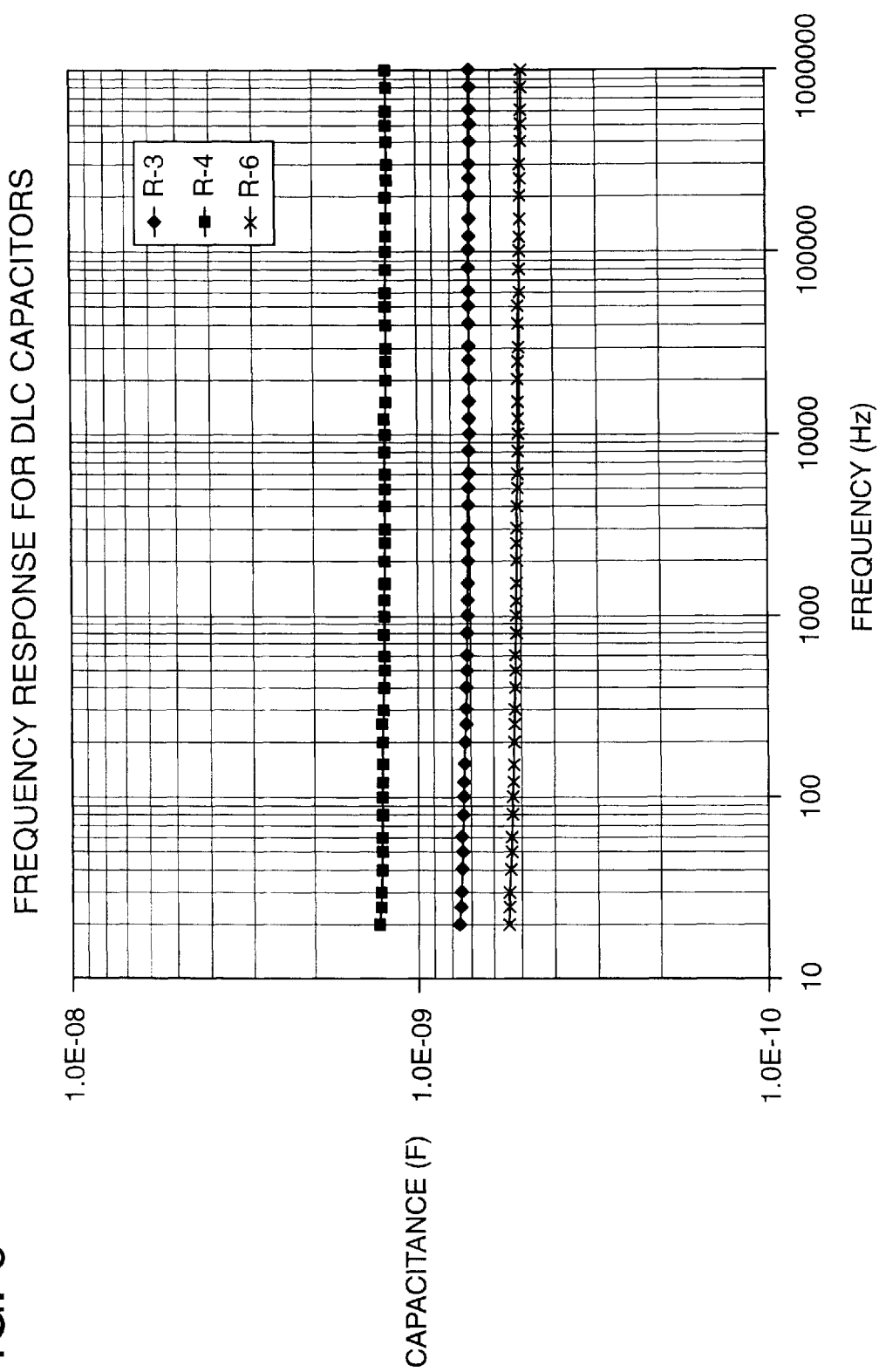
FIG. 6 presents a graph showing the typical frequency response of capacitors of the present invention.

FIG. 6 shows a graph of the typical frequency response for three capacitors of the present invention formed using diamond-like carbon as the dielectric material. This figure shows that the capacitors of the present invention have relatively flat capacitance across a broad range of frequencies. Particularly, the capacitors of the present invention demonstrate a flat capacitance in a frequency range of about 100 hertz to about 1 megahertz but operation to about 1000 megahertz is expected with small capacitors.

Figure 7:
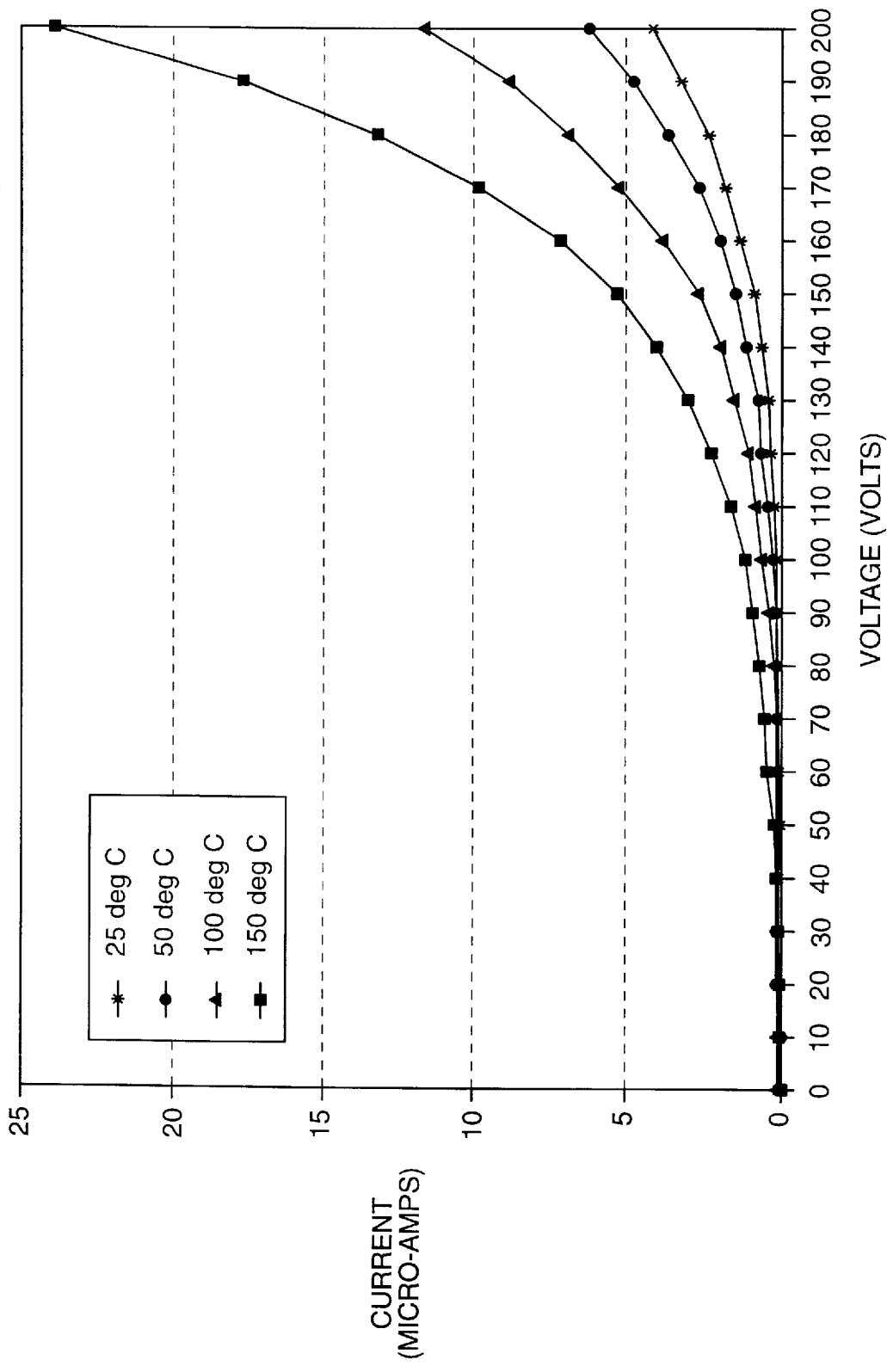
FIG. 7 presents a graph showing typical capacitor leakage as a function of applied voltage at several temperatures above ambient for the capacitors of the present invention.

FIG. 7 demonstrates typical low leakage currents of the capacitors of the present invention, formed using diamond-like carbon as the dielectric material, at temperatures above ambient. The voltage bias was raised as high as 200 volts with no visible signs of electrical breakdown.

Although the deposition process is described above as using a single deposition source to deposit the dielectric onto the electrically conductive substrate, a person of skill in the art will appreciate that the electrically conductive substrate can be coated with two deposition sources. In that situation, each side of the substrate would be coated with a different deposition source and it would not be necessary to manipulate the substrate so that each side is coated by the same deposition source.

One skilled in the art will further appreciate that the capacitors of the present invention function equally as well in a non-rolled configuration. The capacitors of the present invention may also be used in a flat configuration and may still be smaller than conventionally formed capacitors.

The capacitors of the present invention have a myriad uses. Such uses include high temperature alternating current or direct current power filter capacitors and high temperature snubber and energy storage capacitors. The capacitors may also be used as high power filter and high pulse rate switching capacitors. Because of their small size, they are particularly useful in pacemakers and defibrillators.

Having described the invention in detail and by reference to preferred embodiments thereof, it will be apparent that modifications and variations are possible without departing from the scope of the invention which is defined in the appended claims.

What is claimed is:

1. A capacitor comprising:

a first layer including a first electrically conductive substrate having a first surface and a second surface, a first dielectric film deposited on said first surface of said first substrate and a second dielectric film deposited on said second surface of said first substrate; and a second layer contacting said first layer, said second layer including a second electrically conductive substrate having a first surface and a second surface, a third dielectric film deposited on said first surface of said second substrate, and a fourth dielectric film deposited on said second surface of said second substrate, and wherein said capacitor has a rolled configuration formed by rolling said first layer and said second layer about a former.

2. The capacitor of claim 1 wherein each of said dielectric films has a thickness of less than or equal to about 0.5 $\mu$m.

3. The capacitor of claim 1 wherein said capacitor is electrically stable over a temperature range of from about −55° C. to about 200° C.

4. The capacitor of claim 1 wherein each of said dielectric films are deposited by means of ion beam deposition, plasma polymerization of appropriate gases, electron beam polymerization of appropriate monomers, chemical or plasma assisted chemical vapor deposition, e-beam, thermal or laser beam evaporation or sputtering of solid dielectric sources, metallo-organic chemical vapor deposition, laser ablation and excimer laser interactions with appropriate gases.

5. The capacitor of claim 4 wherein each of said dielectric films are deposited by means of an ion beam deposition process.

6. The capacitor of claim 1 wherein said capacitor has a flat capacitance value from about 10 hertz to about 1 megahertz.

7. The capacitor of claim 1 wherein said former is formed from an electrically nonconductive material.

8. The capacitor of claim 7 further including a metal cylinder into which said capacitor in said rolled configuration is positioned.

9. The capacitor of claim 1 wherein said first electrically conductive substrate and said second electrically conductive substrate are selected from the group consisting of aluminum, titanium, nickel, molybdenum, copper and stainless steel.

10. The capacitor of claim 1 wherein each of said dielectric films is selected from the group consisting of polymer films, diamond-like carbon films and amorphous ceramic films.

11. The capacitor of claim 1 wherein said first and second substrates have a thickness of less than or equal to about 4.5 $\mu$m.

12. The capacitor of claim 1 wherein each of said dielectric films are diamond-like carbon having a thickness of less than or equal to about 0.5 $\mu$m and each of said substrates are capacitor grade aluminum foil having a thickness of less than or equal to about 4.5 $\mu$m.

* * * * *